United States Patent
Chatras

(10) Patent No.: US 11,509,697 B2
(45) Date of Patent: *Nov. 22, 2022

(54) METHOD FOR SETTING UP A WEBRTC SESSION

(71) Applicant: Orange, Paris (FR)

(72) Inventor: Bruno Chatras, Paris (FR)

(73) Assignee: ORANGE, Issy-les-Moulineaux (FR)

(*) Notice: Subject to any disclaimer, the term of this patent is extended or adjusted under 35 U.S.C. 154(b) by 0 days.

This patent is subject to a terminal disclaimer.

(21) Appl. No.: 17/334,396

(22) Filed: May 28, 2021

(65) Prior Publication Data
US 2021/0289008 A1 Sep. 16, 2021

Related U.S. Application Data

(63) Continuation of application No. 16/741,417, filed on Jan. 13, 2020, now Pat. No. 11,063,991, which is a
(Continued)

(30) Foreign Application Priority Data

Jun. 10, 2014 (FR) ...................... 1455262

(51) Int. Cl.
*H04L 65/1069* (2022.01)
*H04L 67/10* (2022.01)
(Continued)

(52) U.S. Cl.
CPC ...... *H04L 65/1069* (2013.01); *H04L 65/1016* (2013.01); *H04L 65/65* (2022.05);
(Continued)

(58) Field of Classification Search
CPC ............ H04L 65/1069; H04L 65/1016; H04L 65/608; H04L 65/80; H04L 67/02;
(Continued)

(56) References Cited

U.S. PATENT DOCUMENTS 5,325,424 A 6/1994 Grube
6,757,266 B1 6/2004 Hundscheidt
(Continued)

FOREIGN PATENT DOCUMENTS

CN 103581397 A 2/2014

OTHER PUBLICATIONS

Pascual, Victor, "The IMS approach to WebRTC", Mar. 30, 2014, https://webrtchacks.com/ims-approach-webrtc/ (Year: 2014).
(Continued)

*Primary Examiner* — Ramy M Osman
(74) *Attorney, Agent, or Firm* — Knobbe, Martens, Olson & Bear, LLP

(57) ABSTRACT

Some embodiments relate to a method implemented by a first terminal for setting up a session with a second terminal. An identifier of a session server is obtained at least from a subscriber device in the first terminal which comprises a subscriber identifier and an operator identifier. A session request and an identifier of the second terminal are sent to the server. At least one instruction is received from the server and a message comprising a first set, relative to the first terminal, of at least one characteristic parameter of the requested session is generated in accordance with at least one instruction received and sent to the server. A message is received from the server comprising a second set of at least one characteristic parameter of the requested session, the second set relating to the second terminal and having a non-zero overlap with the first set.

20 Claims, 2 Drawing Sheets

Related U.S. Application Data continuation of application No. 15/317,896, filed as application No. PCT/FR2015/051468 on Jun. 3, 2015, now Pat. No. 10,536,489.

(51) Int. Cl.

| | |
|---|---|
| *H04L 65/80* | (2022.01) |
| *H04L 67/141* | (2022.01) |
| *H04L 67/02* | (2022.01) |
| *H04L 65/1016* | (2022.01) |
| *H04L 65/65* | (2022.01) |
| *H04L 65/1104* | (2022.01) |
| *H04W 80/10* | (2009.01) |

(52) U.S. Cl.
CPC .............. *H04L 65/80* (2013.01); *H04L 67/02* (2013.01); *H04L 67/10* (2013.01); *H04L 67/141* (2013.01); *H04L 65/1104* (2022.05); *H04W 80/10* (2013.01)

(58) Field of Classification Search
CPC ... H04L 67/10; H04L 67/141; H04L 65/1006; H04W 80/10
See application file for complete search history.

(56) References Cited

U.S. PATENT DOCUMENTS

| | | | | |
|---|---|---|---|---|
| 7,864,693 | B2 | 1/2011 | Burman | |
| 8,861,692 | B1 | 10/2014 | Phelps | |
| 9,294,337 | B2* | 3/2016 | Bollapalli | ........... H04L 67/1031 |
| 10,536,489 | B2 | 1/2020 | Chatras | |
| 11,063,991 | B2* | 7/2021 | Chatras | ............... H04L 65/1016 |
| 2005/0125670 | A1 | 6/2005 | Sozzani | |
| 2007/0218924 | A1 | 9/2007 | Burman | |
| 2009/0083426 | A1 | 3/2009 | Cagenius | |
| 2009/0103537 | A1 | 4/2009 | Takahashi | |
| 2014/0219167 | A1 | 8/2014 | Santhanam | |
| 2014/0289303 | A1 | 9/2014 | Tarricone | |
| 2014/0324979 | A1* | 10/2014 | Gao | .................... H04L 65/1096 709/204 |
| 2014/0379931 | A1 | 12/2014 | Gaviria | |
| 2015/0082021 | A1 | 3/2015 | Mandyam | |
| 2015/0106528 | A1 | 4/2015 | Somes | |
| 2015/0120841 | A1 | 4/2015 | Maria | |
| 2015/0264106 | A1* | 9/2015 | Baek | ................... H04L 65/1016 709/203 |
| 2015/0304359 | A1 | 10/2015 | Balasaygun | |
| 2015/0304379 | A1 | 10/2015 | Ezell | |
| 2015/0373057 | A1 | 12/2015 | Ezell | |
| 2015/0382384 | A1* | 12/2015 | Baek | ....................... H04L 65/80 370/329 |
| 2016/0021148 | A1 | 1/2016 | Ljaz | |
| 2016/0112473 | A1 | 4/2016 | Labranche | |
| 2016/0119788 | A1* | 4/2016 | Mandyam | ........... H04L 65/1016 455/411 |
| 2016/0142467 | A1 | 5/2016 | Ban | |
| 2016/0285946 | A1 | 9/2016 | Li | |
| 2016/0033741 | A1 | 11/2016 | Hancock | |
| 2017/0019435 | A1 | 1/2017 | Toutain | |
| 2017/0054769 | A1 | 2/2017 | Pal | |
| 2017/0104704 | A1 | 4/2017 | Choi | |
| 2017/0295475 | A1* | 10/2017 | Patel | ................... H04L 65/1069 |
| 2018/0159901 | A1 | 6/2018 | Chatras | |
| 2018/0255018 | A1 | 9/2018 | Liu | |
| 2019/0306203 | A1 | 10/2019 | Jokela | |
| 2020/0153876 | A1 | 5/2020 | Chatras | |
| 2021/0289008 | A1* | 9/2021 | Chatras | ............... H04L 65/1016 |
| 2021/0289009 | A1* | 9/2021 | Chatras | ................... H04L 65/80 |

OTHER PUBLICATIONS

GSM Association, "WebRTC to compliment IP Communication Services", Feb. 20, 2016, GSMA, Version 1.0 (Year: 2016).

Hollington, J. Dec. 30, 2010. The Complete Guide to FaceTime: Set-up, Use, and Troubleshooting Problems (2010). iLounge.com. Retrieved from the Internet on Feb. 4, 2015: http://www.ilounge.com/index.php/articles/comments/the-complete-guide-to-facetime-set-up-use-and-troubleshooting-problems-2010, 31 pages.

3rd Generation Partnership Project; Technical Specification Group Core Network and Terminals; Numbering, addressing and identification (Release 8). 3GPP TS 23.003, V8.20.0, 77 pages. Mar. 2014.

3rd Generation Partnership Project; Technical Specification Group Core Network and Terminals; Numbering, addressing and identification (Release 9). 3GPP TS 23.003, V9.14.0, 79 pages. Mar. 2014.

3rd Generation Partnership Project; Technical Specification Group Core Network and Terminals; Numbering, addressing and identification (Release 10). 3GPP TS 23.003, V10.9.0, 81 pages. Mar. 2014.

3rd Generation Partnership Project; Technical Specification Group Core Network and Terminals; Numbering, addressing and identification (Release 11). 3GPP TS 23.003, V11.8.0, 84 pages. Mar. 2014.

3rd Generation Partnership Project; Technical Specification Group Core Network and Terminals; Numbering, addressing and identification (Release 12). 3GPP TS 23.003, V12.2.0, 87 pages. Mar. 2014.

3rd Generation Partnership Project; Technical Specification Group Services and System Aspects; IP Multimedia Subsystem (IMS); Stage 2 (Release 12). 3GPP TS 23.228, V12.3.0, 298 pages. Dec. 2013.

3rd Generation Partnership Project; Technical Specification Group Services and System Aspects; Policy and charging control architecture (Release 11). 3GPP TS 23.203, V11.13.0, 182 pages. Mar. 2014.

International Search Report dated Sep. 24, 2015 for International Application No. PCT/FR2015/051468 filed Jun. 3, 2015, 7 pages.

Written Opinion dated Sep. 24, 2015 for International Application No. PCT/FR2015/051468 filed Jun. 3, 2015, 7 pages.

3rd Generation Partnership Project; Technical Specification Group Core Network and Terminals; Characteristics of the IP Multimedia Services Identity Module (ISIM) application (Release 12). 3GPP TS 31.103 V12.1.0, 44 pages. Mar. 2014.

Castillo, et al., "The WebSocket Protocol as a Transport for the Session Initiation Protocol (SIP) draft-ietf-sipcore-sip-websocket-10", SIPCORE Working Group, Internet-Draft, Nov. 29, 2013, pp. 1-24.

Johnston, et al., "WebRTC: APIs and RTCWEB Protocols of the HTML5 Real-Time Web", Second Edition, Jun. 2013, Digital Codex LLC, pp. 1-254.

* cited by examiner

METHOD FOR SETTING UP A WEBRTC SESSION

INCORPORATION BY REFERENCE TO ANY PRIORITY APPLICATIONS

This application is a continuation of U.S. patent application Ser. No. 16/741,417, entitled "METHOD FOR SETTING UP A WebRTC SESSION" filed Jan. 13, 2020, which is a continuation of U.S. patent application Ser. No. 15/317,896, entitled "METHOD FOR SETTING UP A WebRTC SESSION" filed Dec. 9, 2016, and issued on Jan. 14, 2020 as U.S. Pat. No. 10,536,489, which is the U.S. National Phase of Application No. PCT/FR2015/051468 entitled "METHOD FOR SETTING UP A WebRTC SESSION" filed Jun. 3, 2015, which designated the United States, and which claims the benefit of French Application No. 1455262 filed Jun. 10, 2014.

Any and all applications for which a foreign or domestic priority claim is identified in the Application Data Sheet as filed with the present application are hereby incorporated by reference under 37 CFR 1.57.

BACKGROUND

Technical Field

The patent application is in the field of electronic communications using mobile terminals, and more particularly in the field of WebRTC communications (Web Real-Time Communication).

State of the Art

With WebRTC technology, a voice and video communication session can be established from a web browser and by extension from an application, the external behavior of which is equivalent to that of a browser. Today, to start a communication using WebRTC technology from a mobile telephone (typically a smartphone), the user must generally start a compatible browser (e.g. Chrome) to target a particular URL (Uniform Resource Locator, or web address), corresponding to the WebRTC service that the user desires. The browser receives in response an HTML5 page (HTML5: HyperText Markup Language version 5, a format for representing webpages) encapsulating JavaScript code (a script programming language mainly used in interactive webpages) enabling the user to enter the number to call or to select it from an address book hosted by the server or from an address book of the mobile or of the UICC card (UICC: Universal Integrated Circuit Card, also known as a SIM card, for Subscriber Identity Module), if the code encapsulated in the HTML5 page provides for it, and the mobile terminal allows it.

From an ergonomic viewpoint, this is not an optimal procedure since it requires a double entry: entry of the URL and then entry of the telephone number of the called party. It also requires the user to know the URL to be used, according to whether he/she desires these calls to be handled by his/her mobile operator, for example via a gateway to the IMS (IP Multimedia System, a system enabling electronic telecommunications operators to provide fixed and mobile multimedia services), or through a third-party service provider.

From a quality-of-service viewpoint, again this is not an optimal procedure since it can lead the user to make use of a service which is not that of his/her mobile operator, such that the user cannot benefit from the same services as if the call were made using the native software of a mobile terminal, whether this be an IMS client for a VoLTE compatible terminal (VoLTE: Voice over LTE; LTE, Long Term Evolution, is the name of the most recent evolution in the mobile telephony standards, also known as "4G") or software for making calls in circuit mode.

One of the aims of the invention is to remedy these drawbacks of the prior art.

SUMMARY

The invention arrives at improving the situation using a method for establishing a session between a first mobile terminal and a second terminal, comprising the following steps implemented by the first terminal:

a step for obtaining an identifier of a session server, a step for transmitting a session request to the server, using the identifier of the server, a step for transmitting an identifier of the second terminal to the server, a step for receiving at least one instruction from the server, a step for generating, according to the at least one received instruction, a message containing a first set, relating to the first terminal, of at least one characteristic parameter of the requested session, a step for transmitting the generated message to the server, a step for receiving, from the server, a message containing a second set of at least one characteristic parameter of the requested session, the second set relating to the second terminal and having a non-zero intersection with the first set, a step for establishing the session between the first mobile terminal and the second terminal, using the second set of parameters, the identifier of the server being obtained at least from a subscriber module for a mobile electronic communications operator, included in the first terminal, the module containing an identifier of a subscriber and an identifier of the operator.

In order to establish a WebRTC type communication, a first terminal connects to a WebRTC server and receives an HTML or JavaScript code form, which it uses to request a session with a second terminal. For this purpose, the first terminal uses a web browser exchanging HTTP requests or SIP messages with the WebRTC server, for example.

The server processes the session request and transmits to the second terminal a session request on behalf of the first terminal.

The session request transmitted by the first terminal contains a list of session parameters, for example a list of codecs which the first terminal is capable of using. This list is transmitted by the server to the second terminal.

If the second terminal accepts the session request transmitted by the server on behalf of the first terminal, it responds according to a similar process but in the other direction, indicating a subset of session parameters which it is capable of implementing, for example a sub-list of codecs of the first terminal which it is capable of using.

Lastly, the session is established directly between the first and the second terminals, using session parameters common to both terminals, such as for example a common codec.

This procedure for establishing a session is possible only if the first terminal is capable of obtaining the identifier of the correct WebRTC server in order to connect to it.

Advantageously, by virtue of the method for establishing a session according to the invention, the selection of the WebRTC server is performed by a subscriber module included in the first terminal, for example a SIM card. This module contains, in addition to the subscriber and mobile operator identifiers, an identifier of the WebRTC server, which can be a partial or complete address of the server, for example in the form of a URL. Users or subscribers no longer need to select a WebRTC server themselves, nor to enter the URL of this server in a browser themselves. The WebRTC server is selected by their mobile operator, in a manner optimally aligned with the characteristics of the network managed by their mobile operator.

According to one aspect of the invention, the subscriber module is a SIM card. The subscriber can thus change mobile terminal while continuing to benefit from the advantages related to the invention, if he/she removes the SIM card from the old terminal and inserts it into the new one.

According to one aspect of the invention, the session request contains the identifier of the second terminal.

By virtue of this aspect, when the first terminal transmits an HTTP request to the WebRTC server, it can include in the URL an address of the second terminal, for example the telephone number, concatenated with the partial or complete URL of the WebRTC server. Thus, there is only one request and it does not require the subscriber to enter, a second time, the number of the second terminal for another message intended for the server.

According to one aspect of the invention, the method for establishing a session comprises a step for selecting the identifier of the second terminal from an address book.

By virtue of this aspect, the identifier of the second terminal is selected by the user or subscriber from an ordinary address book, hosted locally in the memory of his/her mobile terminal or of the SIM card, or from a remote database queried by a known method.

According to one aspect of the invention, the step for selecting the identifier of the second terminal triggers the step for obtaining the identifier of the server.

By virtue of this aspect, it is when the subscriber selects a contact from his/her usual address book that the session is automatically established using the WebRTC server, the address of which is contained in the SIM card of his/her terminal. Thus, everything proceeds for the subscriber as if the call conveyed by the session were a call using the conventional mobile network of his/her operator, for example a VoLTE call, and not a WebRTC call.

The subscriber therefore does not have to be concerned as to whether the call must pass through the conventional network of his/her operator, a VoLTE network for example, or through the Internet via a WebRTC server, since the WebRTC server which is chosen by his/her operator by virtue of the invention is the one for which a quality of service closest to that of a VoLTE call can be obtained.

The various aspects of the method for establishing a session which have just been described can be implemented independently from one another or in combination with one another.

The invention relates also to a device for establishing a session between a first mobile terminal and a second terminal, comprising the following modules:

a module for obtaining an identifier of a session server, at least from a subscriber module for a mobile electronic communications operator, included in the first terminal, the module containing an identifier of a subscriber and an identifier of the operator, a module for transmitting a session request to the server, using the identifier of the server, a module for receiving at least one instruction from the server, a module for generating, according to the at least one received instruction, a message containing a first set, relating to the first terminal, of at least one characteristic parameter of the requested session, a module for transmitting the generated message to the server, a module for receiving, from the server, a message containing a second set of at least one characteristic parameter of the requested session, the second set relating to the second terminal and having a non-zero intersection with the first set, a module for establishing the session between the first mobile terminal and the second terminal, using the second set of parameters.

The device for establishing a session between a first mobile terminal and a second terminal is contained in a mobile terminal and is suitable for implementing the method for establishing a session, which has just been described, in all its embodiments.

The transmission, generation, reception and establishment modules can form part of a web browser or a WebRTC-compatible dedicated application, installed on the mobile terminal. The obtaining module can form part of an application installed on the SIM card of the mobile terminal.

The invention relates also to a mobile terminal comprising a device for establishing a session between a first mobile terminal and a second terminal, in accordance with that which has just been described.

The invention relates also to a computer program comprising instructions for implementing the steps of the method for establishing a session between a first mobile terminal and a second terminal which has just been described, when this program is executed by a processor.

Lastly, the invention relates to a recording medium that can be read by management equipment, on which the program which has just been described is recorded, able to use any programming language and be in the form of source code, object code or a code intermediate between source code and object code, such as in a partially compiled form or in any other desirable form.

Advantageously, the program according to the invention can be installed either in an executable form in the mobile terminal according to the invention, or in a downloadable form on an application server separate from the terminal. In this latter case, the program can be downloaded from the application server to the terminal upon the initiative of the user of the terminal.

BRIEF DESCRIPTION OF THE DRAWINGS

Other advantages and features of the invention will become clearer upon reading the following description of a particular embodiment of the invention, which embodiment is given by way of simple illustrative and nonlimiting example, and from the appended drawings in which.

DETAILED DESCRIPTION

Hereafter in the description, examples of several embodiments of the invention are presented, based on the 3GPP LTE/EPC standard, but the invention also applies to other former or later 3GPP standards, such as UMTS (Universal Mobile Telecommunications System, also known as 3G) or 5G.

Figure 1:
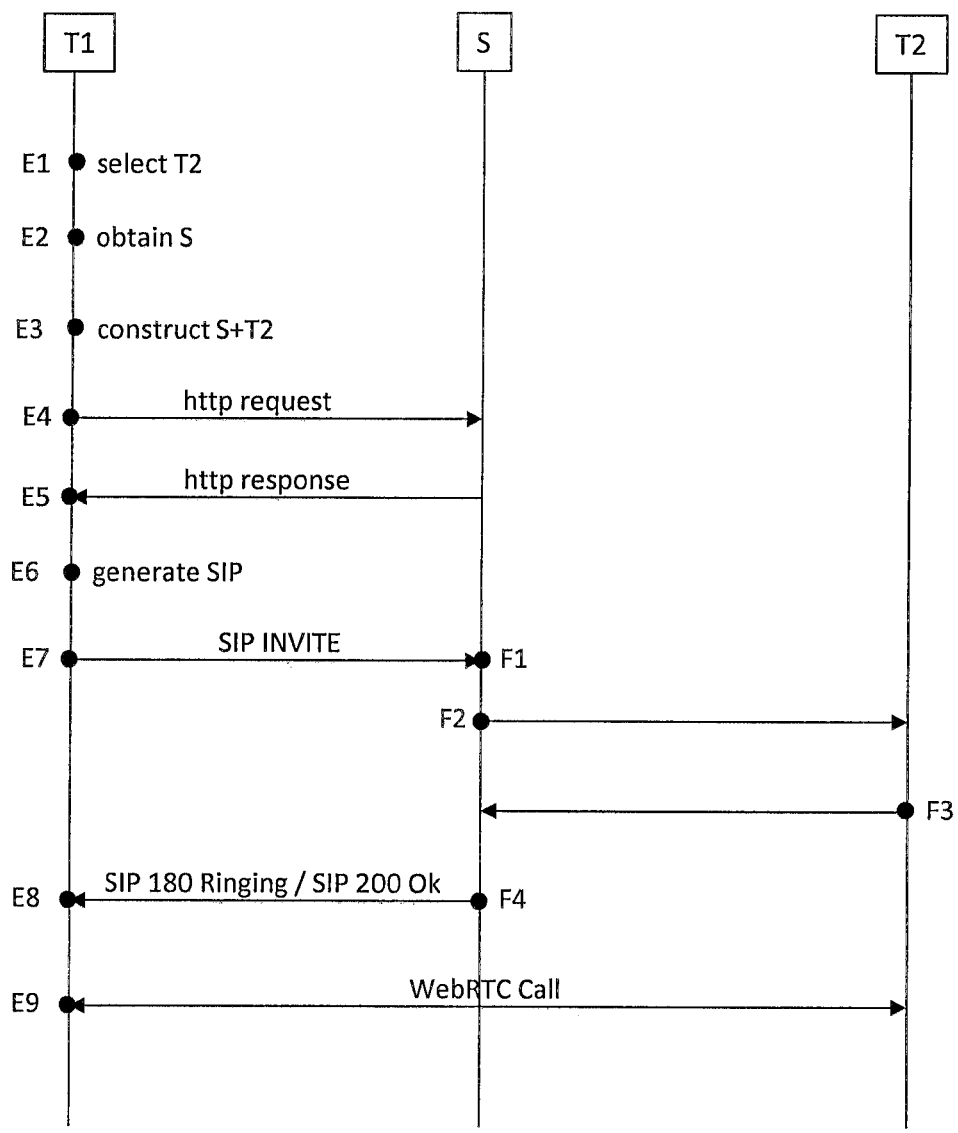
FIG. 1 schematically presents an example implementation of the steps of a method for establishing a session between a first mobile terminal and a second terminal, according to the invention.

FIG. 1 schematically presents an example implementation of the steps of a method for establishing a session between a first mobile terminal T1 and a second terminal T2, according to the invention.

In this example, the user of a mobile terminal T1 calls the user of another terminal T2, for a voice or video communication with him/her by means of the terminals.

The terminal T1 is a mobile terminal including a subscriber module, i.e. a SIM card containing an identifier of a subscriber to a mobile electronic communications operator, as well as an identifier of the operator. With such a module, the terminal T1 can establish a "real-time" session to transport voice or video between this terminal and another terminal T2, using the resources of this operator or those of another operator having established roaming agreements therewith. This real-time session uses one or more codecs to change the voice/video from analog form to digital form and vice versa. The terminal T1 is capable of using a set of codecs which is not necessarily the same as that of T2. A negotiation must therefore have taken place between the terminals T1 and T2 in order to determine the codec or codecs to be used.

The terminal T1 is also suitable for establishing a WebRTC session, i.e. a communication session based for example on an SRTP, UDP and IP protocol stack between two applications hosted by the terminals T1 and T2 respectively. These applications are typically called web browsers. The transport resources of the operator of T1, which are used for such a session, such as those of its LTE access network and of its EPC core network, are determined by the choice of the WebRTC server which offers the web service enabling the terminal T1 to establish a communication session with the terminal T2. It is therefore beneficial for the operator to keep control over the establishment of the WebRTC session.

During a step E1, the user of the terminal T1 selects an identifier of the terminal T2, i.e. generally a telephone number, generally from an address book which can be local or remote. If it is local, it can be hosted in the memory of the terminal or in that of the SIM card. If it is remote, the terminal T1 accesses it for example from a web browser or a dedicated application, according to a known procedure.

The expression "to select an identifier" in the sense of step E1 also includes the case in which the user him/herself dials the telephone number of the terminal T2 if it is absent from the address book.

During a step E2, which can be triggered automatically by step E1, the terminal T1 obtains the identifier of a WebRTC server, that of the server S, which must be used to establish the session with the terminal T2. Preferably, this identifier can be obtained from the SIM card of the terminal T1.

For example, "http://webrtc.orange.com" is a string of characters representing a URL address corresponding to the WebRTC server of an operator called Orange, i.e. the server S. This string can be stored in SIM cards of mobile terminals managed by this operator in order to be read by the terminal during step E2.

This string can also be obtained by adding a predefined prefix, predefined by standards or by the operator when the mobile is customized, to the home network domain name featuring in the SIM card.

For example, if the domain name is "ims.orange.com" and the prefix is "webrtc", the URL will be "http://webrtc.ims.orange.com".

This string can even be obtained by adding a predefined prefix to the home network domain name formed from a country code (MCC) and from an operator network code (MNC), for example as specified in the standard 3GPP TS 23.003.

For example, for the operator Orange, the URL can be: "http://webrtc.ims.mnc015.mcc234.3gppnetwork.com".

During a step E3, the terminal T1 constructs an address containing both the identifier of the server S obtained during step E2 and the identifier of the terminal T2 selected during step E1. For example, if the identifier of the terminal T2 is the telephone number of the user associated with the terminal T2, +33299124167, the constructed URL can be: "http://webrtc.ims.orange.com/tel/0033299124167".

During steps E4 and E5, the terminal T1 connects to the server S.

The terminal T1 transmits during step E4 a request for access to a WebRTC service offered by the server S, referred to as a session request to the server S, in the form of an HTTP request using the URL constructed during step E3. It is understood that in this embodiment of the invention, the session request to the server S contains the identifier of the terminal T2.

The terminal T1 receives during step E5 an HTTP response from the server S, containing instructions in the form of JavaScript code, for example encapsulated in an HTML5 page. These instructions enable the terminal T1 to generate a message to be transmitted according to a protocol decided upon by the WebRTC server and in a manner transparent to the terminal, and by retrieving information from the terminal such as for example the available codecs, and/or by retrieving certain audio/video streams from the microphone and/or from the camera, in order to be able to transmit them to the outside.

During a step E6, the terminal T1 generates a session request to the terminal T2 according to the content of the JavaScript code received during step E5. For example, if the protocol used by the WebRTC service provider is SIP, a SIP over WebSocket message "INVITE tel:0033299124167 SIP 2.0" can be generated by the terminal T1, if the JavaScript code contains the identifier of T2. WebSocket is a protocol providing for obtaining a channel for simultaneous bidirectional communications above the TCP (Transmission Control Protocol) layer. This SIP message also contains the SDP (Session Description Protocol) offer of the terminal T1, i.e. a set of codecs that can be used by the terminal T1, and its ports and addresses for the media streams (voice, video, etc.).

Alternatively, if the WebRTC service provider does not use the SIP protocol, an HTTP request can be generated during step E6, containing the identifier of the terminal T2 and the codecs, addresses and ports of T1.

If the JavaScript code received during step E5 does not contain the identifier of the terminal T2, this identifier must be retrieved one way or another by the terminal in order to be inserted into the HTTP request generated during step E6. In that case, the HTML5 page will typically have, in addition to the JavaScript code, a form to enter the identifier, for example a telephone number.

Alternatively, protocols other than SIP or HTTP can be used. In these cases, it is also the JavaScript code instructions which will indicate to the browser of the terminal T1 how to generate the session request, and in how many messages.

During a step E7, the session request generated during step E6 is transmitted by the terminal T1 to the server S.

During a step F1, the server S receives this request.

During a step F2, the server S transmits to the terminal T2 an identical or equivalent request, containing the same information as the request transmitted by the terminal T1 during step E7. There can be one or more intermediate servers between the server S and the terminal T2. The protocol or protocols used between the server S and the terminal T2 can also differ from that or those used between the server S and the terminal T1, if they allow a negotiation of the SDP offer between the terminals T1 and T2.

During a step F3, the terminal T2 transmits in response to the server S a session request to T1, containing an SDP answer, i.e. a subset of the codecs proposed by the terminal T1, or their equivalent. This subset contains the codecs proposed by the terminal T1 which the terminal T2 is capable of using.

During a step F4, the server S transmits to the terminal T1 an identical or equivalent request, containing the same information as the request transmitted by the terminal T2 during step F3.

During a step E8, the terminal T1 receives the session request of the terminal T2. This request can take the form of a "180 Ringing" or "200 OK" SIP message, containing the SDP answer, i.e. the subset of the codecs proposed by the terminal T1 which the terminal T2 is capable of using, as well as an address and a port on which the terminal T2 expects the media streams transmitted by the terminal T1.

Lastly, during a step E9, the communication session between the terminals T1 and T2 is established using one or more of the codecs compatible with the terminal T2.

In an alternative embodiment, step E3 is replaced by a step G3 (not illustrated) for constructing an address containing the identifier of the server S and one or more possible prefixes, but not the identifier of the terminal T2. This provides for covering the case in which the user him/herself dials a number which is not in his/her address book.

Step E4 is replaced by a step G4 (not illustrated) for transmitting a session request to the server S, but in which the session request to the server S does not contain the identifier of the terminal T2.

Step E1 for selecting the identifier of the terminal T2 can be replaced by a step G1 (not illustrated) for obtaining the identifier of the terminal T2, for example by the user dialing the number. Step E1, or step G1, can in this embodiment take place after step E2 for obtaining the identifier of the server S.

Step E6 then awaits completion of step E1, or step G1, and it is only during step E7 for transmitting the session request when the identifier of the terminal T2 is transmitted.

Figure 2:
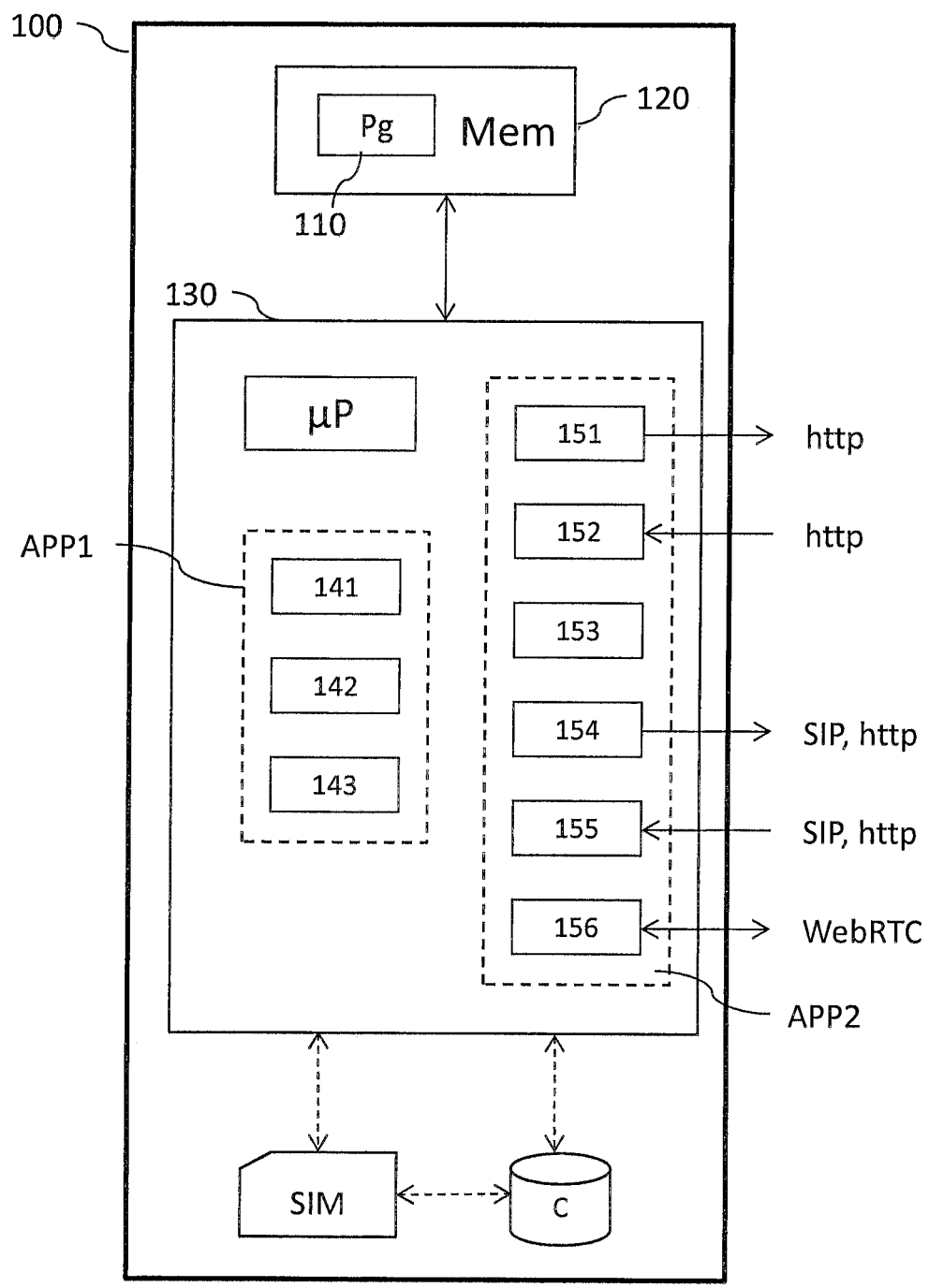
FIG. 2 presents an example structure of a device for establishing a session between a first mobile terminal and a second terminal, according to one aspect of the invention.

With reference to FIG. 2, there is now presented an example structure of a device for establishing a session between a first mobile terminal and a second terminal, according one aspect of the invention.

The device 100 implements the method for establishing a session between a first mobile terminal and a second terminal, various embodiments of which have just been described.

Such a device 100 can be implemented in a mobile terminal suitable for establishing an IP connection with a node of an access network, conveyed by a radio connection.

For example, the device 100 comprises a processing unit 130, equipped for example with a microprocessor µP, and driven by a computer program 110 stored in a memory 120 and implementing the method for establishing a session between a first mobile terminal and a second terminal according to the invention. Upon initialization, the code instructions of the computer program 110 are for example loaded into a RAM memory before being executed by the processor of the processing unit 130.

Such a device 100 comprises:
a selection module 141, suitable for selecting an identifier of a remote terminal from an address book C,
an obtaining module 142, suitable for obtaining an identifier of a WebRTC server from a subscriber module SIM, or SIM card,
a construction module 143, suitable for constructing an identifier, such as for example a URL address, by combining the identifier of the selected remote terminal, the identifier of the WebRTC server and if necessary another identifier such as a predetermined prefix,
a transmission module 151, suitable for transmitting a session request to a WebRTC server, in the form of an HTTP request containing the constructed URL address,
a reception module 152, suitable for receiving an instruction from the WebRTC server, for example an HTTP response,
a generation module 153, suitable for generating a session request to the remote terminal based on the instruction received from the WebRTC server, for example in the form of an SIP message or an HTTP request containing an SDP offer,
a transmission module 154, suitable for transmitting the generated session request to the WebRTC server,
a reception module 155, suitable for receiving from the WebRTC server a session request on behalf of the selected remote terminal, for example in the form of an SIP message or an HTTP response containing an SDP answer,
an establishment module 156, suitable for establishing a WebRTC session with the selected remote terminal, for example using information contained in the received SDP answer.

The modules 141, 142 and 143 can be included in a first application APP1 running on the SIM card of the mobile terminal implementing the device 100. The address book C can be stored in the SIM card, in a memory of the mobile terminal outside the SIM card or in separate equipment outside the mobile terminal, accessible using a dedicated application. The application APP1 can also run on the mobile terminal outside the SIM card. This application APP1 can be pre-installed by the manufacturer of the mobile or the operator, or installed by the subscriber by downloading from an Internet site such as for example an app store.

The modules 151 to 156 can be included in a second application APP2 acting as WebRTC client. This application APP2 can be a WebRTC-compatible browser running on the mobile terminal, such as Chrome, Firefox, Opera, Internet Explorer, Safari, etc. or a dedicated WebRTC-compatible application able to be executed outside the browser and installed on the mobile terminal. This application APP2 can be pre-installed by the manufacturer of the mobile or the operator, or installed by the subscriber by downloading from an Internet site such as for example an app store.

The modules described with reference to FIG. 2 can be hardware or software modules.

By virtue of the device for establishing a session between a first mobile terminal and a second terminal according to the invention, several ergonomic features are possible for establishing a call in WebRTC mode, in particular:
either the application APP1 is started from the address book C by selecting therein an identifier, or contact, and by pressing on an icon or a key of the mobile terminal to start the application APP2 and thus establish the session, i.e. the call,
or the application APP1 is started from the home screen of the mobile terminal, by pressing on a key or an icon to open the address book C, select a contact in it, start the application APP2 and thus establish the session, i.e. the call.

The application APP1 is associated with an icon or a key of the mobile terminal when the application APP1 is initialized, for example when the terminal is put into operation with the SIM card inserted, according to a method which depends on the terminal and on the operating system used.

The example embodiments of the invention which have just been presented are only some of the conceivable embodiments. They show that the invention enables a subscriber to a mobile telecommunication service to benefit from the WebRTC service best adapted to the network of his/her operator, in a manner transparent to him/her, simply by selecting or entering the telephone number of his/her correspondent on his/her mobile terminal.

What is claimed is:

1. A method for establishing a session between a first mobile terminal and a second terminal, comprising the following processes implemented by the first terminal:
   obtaining, from at least a subscriber identity module managed by a mobile communication operator, an address of a server for managing a request for access to a Web Real-Time Communication (WebRTC) service, the subscriber identity module containing an identifier of a subscriber and an identifier of the operator, wherein the address is represented by a string of characters obtained by adding a predefined prefix to a home network domain name;
   transmitting a request for access to a WebRTC service to the server for managing a request for access to a WebRTC service, using the obtained address of the server;
   receiving at least one instruction from the server for managing a request for access to a WebRTC service;
   generating, according to the at least one received instruction, a session request containing a first set, relating to the first terminal, of at least one characteristic parameter of the requested session;
   transmitting the generated session request to a server for processing a session request;
   receiving, from the server for processing a session request, a message containing a second set of at least one characteristic parameter of the requested session, the second set of at least one characteristic parameter relating to the second terminal and having a non-zero intersection with the first set; and
   establishing the session between the first mobile terminal and the second terminal, at least using the second set of at least one characteristic parameter.

2. The method of claim 1, wherein the prefix is predefined by at least one standard or by the mobile communication operator.

3. The method of claim 1, wherein the home network domain name is featured in the subscriber identity module.

4. The method of claim 1, wherein the subscriber identity module is a SIM card.

5. The method of claim 1, wherein the at least one instruction is in the form of Javascript code.

6. The method of claim 1, wherein the request for access to a WebRTC service is a HTTP request, the at least one instruction being received by the first terminal in a HTPP response.

7. The method of claim 1, wherein the server for managing a request for access to a WebRTC service and/or the server for processing a session request is a WebRTC server.

8. A device for establishing a session between a first mobile terminal and a second terminal, the device comprising a processor and a memory, the device configured to:
   obtain, from at least a subscriber identity module managed by a mobile communication operator, an address of a server for managing a request for access to a Web Real-Time Communication (WebRTC) service, the subscriber identity module containing an identifier of a subscriber and an identifier of the operator, wherein the address is represented by a string of characters obtained by adding a predefined prefix to a home network domain name;
   transmit a request for access to a WebRTC service to the server for managing a request for access to a WebRTC service, using the obtained address of the server;
   receive at least one instruction from the server for managing a request for access to a WebRTC service;
   generate, according to the at least one received instruction, a session request containing a first set, relating to the first terminal, of at least one characteristic parameter of the requested session;
   transmit the generated session request to a server for processing a session request;
   receive, from the server for processing a session request, a message containing a second set of at least one characteristic parameter of the requested session, the second set of at least one characteristic parameter relating to the second terminal and having a non-zero intersection with the first set; and
   establish the session between the first mobile terminal and the second terminal, at least using the second set of at least one characteristic parameter.

9. The device of claim 8, wherein the prefix is predefined by at least one standard or by the mobile communication operator.

10. The device of claim 8, wherein the home network domain name is featured in the subscriber identity module.

11. The device of claim 8, wherein the subscriber identity module is a SIM card.

12. The device of claim 8, wherein the at least one instruction is in the form of Javascript code.

13. The device of claim 8, wherein the request for access to a WebRTC service is a HTTP request, the at least one instruction being received by the first terminal in a HTPP response.

14. The device of claim 8, wherein the server for managing a request for access to a WebRTC service and/or the server for processing a session request is a WebRTC server.

15. A device for establishing a session between a first mobile terminal and a second terminal, wherein the device is configured to:
   obtain, from at least a subscriber identity module managed by a mobile communication operator, an address of a server for managing a request for access to a Web Real-Time Communication (WebRTC) service, the subscriber identity module containing an identifier of a subscriber and an identifier of the operator, wherein the address is represented by a string of characters comprising at least one prefix, a country code MCC, an operator code MNC, and a home network domain name;
   transmit a request for access to a WebRTC service to the server for managing a request for access to a WebRTC service, using the obtained address of the server;
   receive at least one instruction from the server for managing a request for access to a WebRTC service;

generate, according to the at least one received instruction, a session request containing a first set, relating to the first terminal, of at least one characteristic parameter of the requested session;

transmit the generated session request to a server for processing a session request;

receive, from the server for processing a session request, a message containing a second set of at least one characteristic parameter of the requested session, the second set of at least one characteristic parameter relating to the second terminal and having a non-zero intersection with the first set; and establish the session between the first mobile terminal and the second terminal, at least using the second set of at least one characteristic parameter.

16. The device of claim 15, wherein the at least one prefix comprises the "ims" string of characters.

17. The device of claim 15, wherein the at least one prefix comprises the "webrtc" string of characters.

18. The device of claim 15, wherein the at least one instruction is in the form of Javascript code.

19. The device of claim 15, wherein the request for access to a WebRTC service is a HTTP request, the at least one instruction being received by the first terminal in a HTPP response.

20. The device of claim 15, wherein the server for managing a request for access to a WebRTC service and/or the server for processing a session request is a WebRTC server.

* * * * *